UNITED STATES PATENT OFFICE.

ROBERT LEE ULMAN, OF BALTIMORE COUNTY, MARYLAND.

PROCESS OF PRODUCING SUGARS.

1,259,568.  Specification of Letters Patent.  Patented Mar. 19, 1918.

No Drawing.  Application filed September 28, 1916.  Serial No. 122,748.

*To all whom it may concern:*

Be it known that I, ROBERT LEE ULMAN, a citizen of the United States, and a resident of Baltimore county, in the State of Maryland, have invented a new and useful Process of Producing Sugars, of which the following is a specification.

The object of the present invention is to produce sugars from industrial waste materials such as brewers' and distillers' grain after they are spent in the ordinary industrial processes of brewing beer or distilling spirituous liquors or alcohol and leave the solid matter, after extraction of the sugars, in condition, physically and chemically, suitable for use as stock food.

Grains of this character, notwithstanding the removal of the greater portion of their starch as an incident to the processes for which they are primarily used, contain constituents from which sugars may be produced; these constituents existing for the most part in the form of simple and complex carbohydrates, including residual starch, oxy-, hemi-, and true celluloses and allied constituents; and these grains are in a condition which especially adapts them for the present process, particularly as regards their mechanical condition, as a result of the previous treatment to which they have been subjected. In addition to the sugar bases, grains of this kind have a high content of protein and allied nutritive constituents which makes them especially valuable as stock food. The present invention changes the relative proportion of carbohydrate and protein food values in a manner to make the grains more nutritious to the animal, and thus renders the refuse from the present process better as a stock food than it was at the end of the primary brewing or distilling process, from which raw materials for the present process are intended to be procured.

In carrying out the invention, I take refuse grain from one or more of the sources named and treat it with a dilute mineral acid at a temperature of about 115° to 120° C., which conditions are maintained for a suitable period, after which the fluid, with the converted carbohydrates withdrawn into solution, is removed, preferably after cooling has taken place, and the solid matter free from any matter that would be harmful to stock, using the material as food, is left separated and available as a valuable commercial product, and the withdrawn solution is then, if desired, approximately neutralized; the neutralization being preferably limited, however so as to leave slight acidity sufficient to favor the action of yeast in the subsequent step of fermentation. After neutralization any precipitate resulting from the neutralizing step may be removed by filtration or other mechanical means and the liquor will then be found to contain sugars of a large and profitable quantity.

For the sake of economy and efficient operation, the same charge of dilute mineral acid, which I call the "converting solution," will preferably be applied to a plurality of batches of grain, consecutively, before being neutralized, as by so doing, an increased quantity of the sugars will be held in solution and subsequent steps of the process will operate more satisfactorily. Three batches of grain will be found to be sufficient to develop the desirable strength in most instances. It is also preferable to resort to the steps of sparging the batches of grain that have become more or less spent in the converting step of the present process, in order to remove from them remaining values, the several sparging waters being subsequently used, preferably after their strength has developed to a profitable degree, for use as the converting bath, for which they are rendered suitable by the addition of the proper proportion of acid.

The liquor finally obtained with its desired proportion of sugars, may be treated in accordance with known processes, by the addition of suitable yeasts to cause fermentation, and to develop alcohol which may be distilled off. The residual liquor after distillation may be discarded, or retained and treated for the recovery of remaining values which will be chiefly in the form of unfermentable sugars.

The step of approximately neutralizing the liquor resulting from the conversion step, need not be resorted to immediately; on the contrary, the acidulated sugar-containing liquor may of itself constitute a vendible commodity to be bought or sold and treated subsequently, in which case the acid may well be relied upon to preserve the liquor against fermentation during transportation or storage, or until the desired time of neutralizing the contained sugar for fermentation or other purposes.

The completely spent grain remaining after conversion and sparging, as taught by the present invention has been changed by the process in a manner to render it more nutritious than such grain was prior to treatment by the present process; its protein and allied constituents, of which it is largely composed, are left intact although concentrated; the grain has lost considerable of its weight by the removal of matters largely unnutritious and nondigestible, and it is, therefore, a more valuable stock food than when issuing from the brewers' or distillers' processes.

In carrying out my process I take, for instance, 100 parts by weight of wet grains as issuing from the brewers' or distillers' processes. I determine the relative proportion of solid matter and water therein, which I have found to be usually about 20 per cent. by weight of solid matter and 80 per cent. of water. I have found that the addition of mineral acid and water so that the total shall be in the proportions of approximately 20 parts by weight of solid matter, 4 parts of pure concentrated acid and 196 parts of water is satisfactory. I have found a good working temperature to be between 115° C. and 120° C., and I have found a solution of sulfuric acid ($H_2SO_4$) to give good results. The heating of the grain in the presence of the dilute mineral acid should continue until the maximum production of sugars has occurred. I have found fifteen minutes, usually, to be a satisfactory period of time. After cooling, I have found chalk to be a good neutralizing medium. I have found by examination of the resultant liquor by the Fehling test a conversion of 25 or more per cent., by weight, of the original solid matters into sugars to be an average result.

I claim:—

1. The process of producing sugars and stock food, which consists in treating industrial waste materials such as brewers' or distillers' spent grain to the converting action of a dilute mineral acid at a temperature from 115° C. to 120° C.; then separating the liquor thus produced; then approximately neutralizing the solution drawn off and leaving the solid matter unaffected by the neutralizing agent.

2. The process of producing sugars and stock food, which consists in treating industrial waste materials such as brewers' or distillers' spent grain to the converting action of a 2 per cent. solution of mineral acid at a temperature from 115° C. to 120° C.; then separating the liquor thus produced; then approximately neutralizing the solution drawn off and leaving the solid matter unaffected by the neutralizing agent.

3. The process of converting industrial waste materials such as spent brewers' and distillers' grain into sugars and digestible stock food, which consists in heating the grain in a dilute solution of a mineral acid until its carbohydrates are converted, and withdrawn into solution, and its proteins left, separating the solution of converted carbohydrates, approximately neutralizing this separated solution, and leaving the solid matter free from the effect of the neutralizing agent.

4. The process of converting industrial waste materials, such as spent brewers' or distillers' grain, into sugars and digestible stock food, which consists in heating the grain in a dilute solution of a mineral acid until its carbohydrates are converted, and withdrawn into solution, and its proteins left, and separating the solution of converted carbohydrates and leaving the solid matter free from acid and deleterious substance.

The foregoing specification signed at Baltimore, Maryland, this 27th day of September, 1916.

ROBERT LEE ULMAN.